Figure 1:
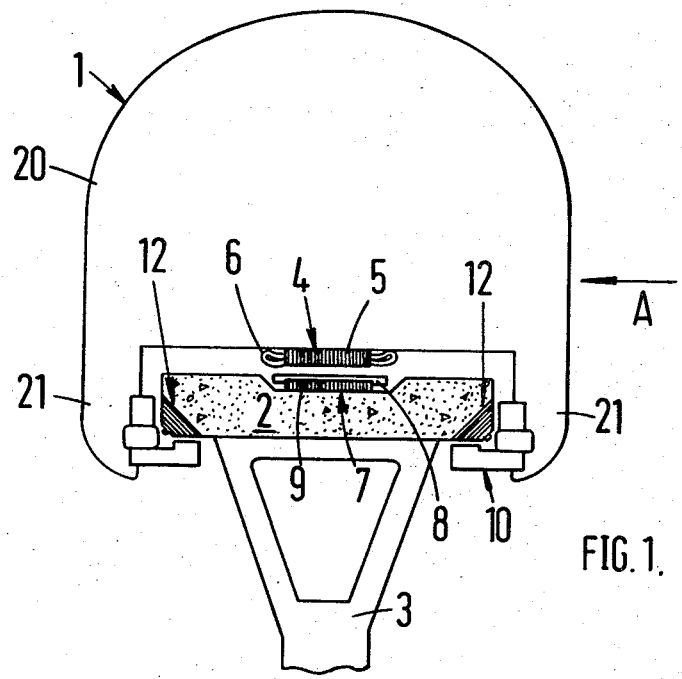

United States Patent [19]
Fellows et al.

[11] 3,834,318
[45] Sept. 10, 1974

[54] GROUND TRANSPORTATION SYSTEMS AND TRACKS AND VEHICLES THEREFOR

[75] Inventors: Thomas George Fellows, Barnet; Richard John Armstrong, Bevan, Waterbeach, both of England

[73] Assignee: Tracked Hovercraft Limited, London, England

[22] Filed: Jan. 23, 1973

[21] Appl. No.: 326,030

[30] Foreign Application Priority Data
Jan. 24, 1972  Great Britain ..................... 3332/72

[52] U.S. Cl. ...................... 104/148 MS, 104/23 FS
[51] Int. Cl. ....................... B61b 13/04, B61b 13/08
[58] Field of Search... 104/148 MS, 148 LM, 23 FS; 246/182 C

[56] References Cited
UNITED STATES PATENTS

| | | | |
|---|---|---|---|
| 3,516,364 | 6/1970 | Machefert-Tassin | 104/148 LM |
| 3,724,388 | 4/1973 | Karch | 104/148 MS |
| 3,780,668 | 12/1973 | Schwarzler et al. | 104/148 MS |

FOREIGN PATENTS OR APPLICATIONS

| | | | |
|---|---|---|---|
| 707,032 | 5/1941 | Germany | 104/148 MS |
| 1,212,980 | 11/1970 | Great Britain | 104/148 LM |

OTHER PUBLICATIONS

"Thyristor Voltage Controls Used for Metroliner Propulsion," Railway Locomotives and Cars, February 1971, pp. 24, 25.

*Primary Examiner*—M. Henson Wood, Jr.
*Assistant Examiner*—George H. Libman
*Attorney, Agent, or Firm*—Cameron, Kerkam, Sutton, Stowell & Stowell

[57] ABSTRACT

In a ground transportation system comprising a prepared track and a vehicle adapted for operation along the track, the vehicle has first and second electromagnets spaced laterally apart on the vehicle. The track has two lengths of magnetic material extending along the track and arranged so as in combination with the core of each electromagnet to provide a transverse low reluctance path for magnetic flux. Of the two air gaps in each flux path, one is formed by faces of the magnetic material and the core which are substantially vertical and the other is formed by faces of the magnetic material and the core which are substantially horizontal. By controlling the electric supply to the electromagnets the vehicle can be maintained substantially at a predetermined transverse position relative to the track.

18 Claims, 11 Drawing Figures

GROUND TRANSPORTATION SYSTEMS AND TRACKS AND VEHICLES THEREFOR

This invention relates to ground transportation systems, that is to say, to systems having prepared tracks and vehicles adapted for operation therealong.

According to a first aspect of the present invention there is provided a ground transportation system comprising a prepared track and a vehicle adapted for operation along the track, the vehicle comprising a vehicle body, first and second electromagnets spaced laterally apart on said body and each having a magnetic core and an energising winding, the core of each electromagnet having first and second pole faces substantially conforming to respective planes, the normals to which lie in a perpendicular plane oriented transversely of the vehicle, the normal to the first pole face having a vertical component and the normal to the second pole face having a horizontal component, the second pole face of the first electromagnet facing in the opposite direction for the second pole face of the second electromagnets, the track comprising magnetic material extending along the track and arranged confronting the pole faces of each electromagnet so as to provide, in combination with the core of each electromagnet, a low reluctance path for a magnetic flux generated by energisation of the respective winding, the vehicle also comprising a position sensor for each electromagnet adapted to sense the vertical position of such electromagnet relative to the track and control means for each electromagnet responsive to said position of sensor for varying the supply of current to the energising winding of said electromagnet so that, by varying the attractive forces between the cores of the electromagnets and the magnetic material of the track, the electromagnets maintain the vehicle substantially at a predetermined transverse position relative to the track.

Each opposed pair of pole faces may advantageously be of the same width as one another transversely of the track so that a substantial shear force is generated whenever a transverse movement of the vehicle causes them to become offset from one another. If desired, however, only the vertical or, alternatively, only the horizontal faces may be of the same width as one another, so that substantial shear forces are only generated in the vertical, or, as appropriate, horizontal sense.

The electromagnets may be so arranged that the direct (i.e., vertical) forces generated between the opposed horizontal faces act on the vehicle in the upward direction; in so doing they at least partly support the vehicle. Alternatively the direct forces produced between the opposed horizontal faces may act downwardly on the vehicle, in which case other means must be provided for vehicle support. The latter arrangement has some advantage where the support means are of the kind to generate cushions of pressurised gas between vehicle and track, since it has the effect of increasing the stiffness of the cushions.

According to a preferred feature of the present invention the electromagnets are individually controlled by the control means in response to variations in magnitude of the air gaps associated with their horizontal faces. For the purposes of the control of the lateral position of the vehicle (i.e., for vehicle guidance) the sensing of the vehicle lateral position is effected indirectly, making use of the variations in reluctance of the magnetic paths associated with the electromagnets resulting from lateral movement of the vehicle.

According to a second aspect of the present invention, there is provided a vehicle for a ground transportation system in accordance with the invention comprising a vehicle body, first and second electromagnets spaced laterally apart on said body and each having a magnetic core and an energising winding, the core of each electromagnet having first and second pole faces substantially conforming to respective planes, the normals to which lie in a perpendicular plane oriented transversely of the vehicle body, the normal to the first pole face having a vertical component and the normal to the second pole face having a horizontal component, the second pole face of the first electromagnet facing in the opposite direction to that of the second electromagnet, a position sensor for each electromagnet being adapted to sense the vertical position of such electromagnet, and control means for each electromagnet being responsive to said position sensor for varying the supply of current to said electromagnet.

According to a third aspect of the present invention, there is provided a track for a ground transportation system in accordance with the invention comprising a structural member extending along the length of the track and having two members of magnetic material extending along the track and disposed at horizontally adjacent corners of the beam, each member of magnetic material having first and second pole faces substantially conforming to planes, the normals to which lie in a perpendicular plane oriented generally transversely of the track, the normal to the first pole face having a vertical component and the normal to the second pole face having a horizontal component, a second pole face of one of the members facing in the opposite direction to the second pole face of the other member.

Figure 2:
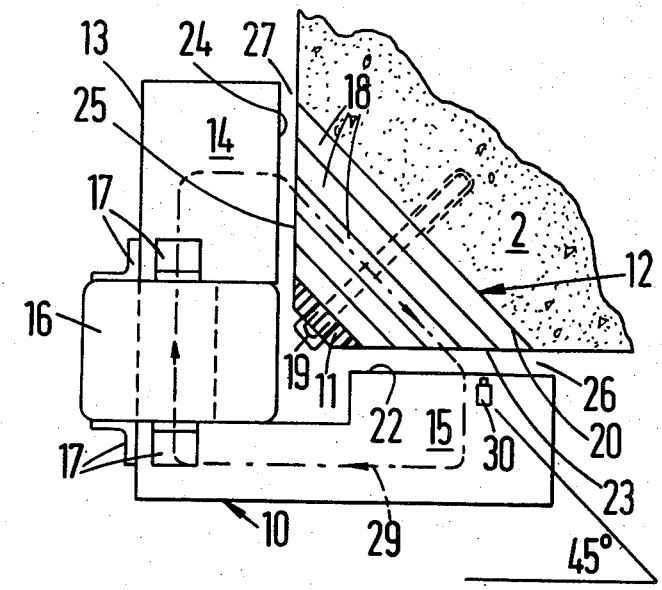
Figure 3:
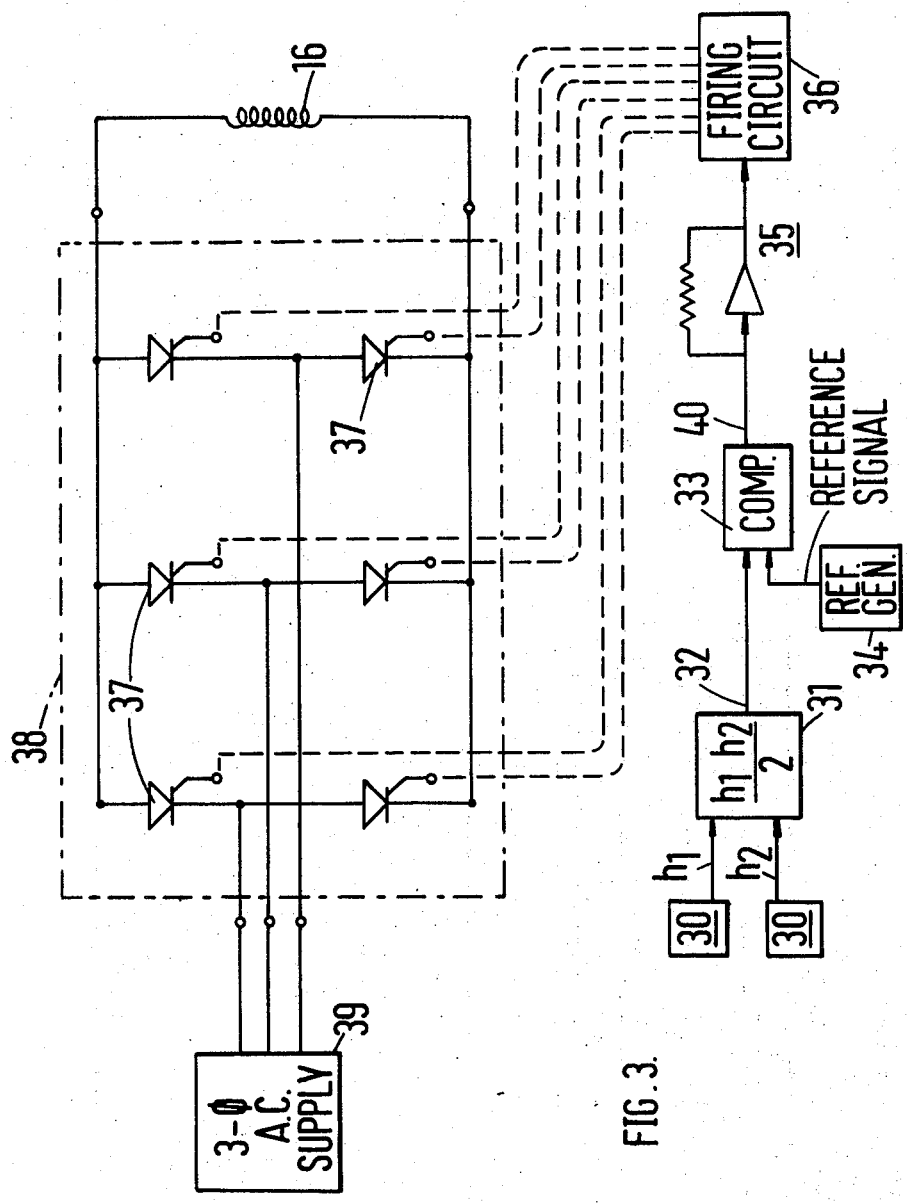
Figure 8:
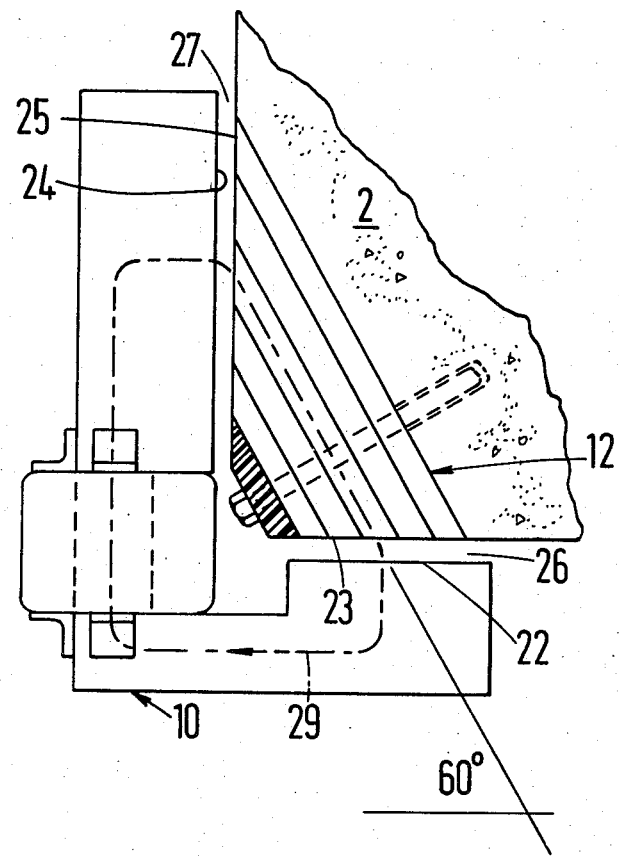
Figure 9:
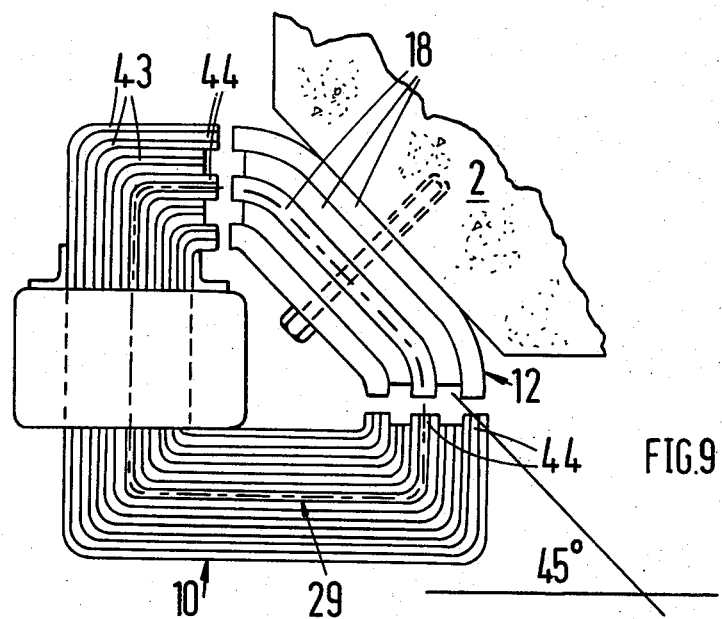
Figure 10:
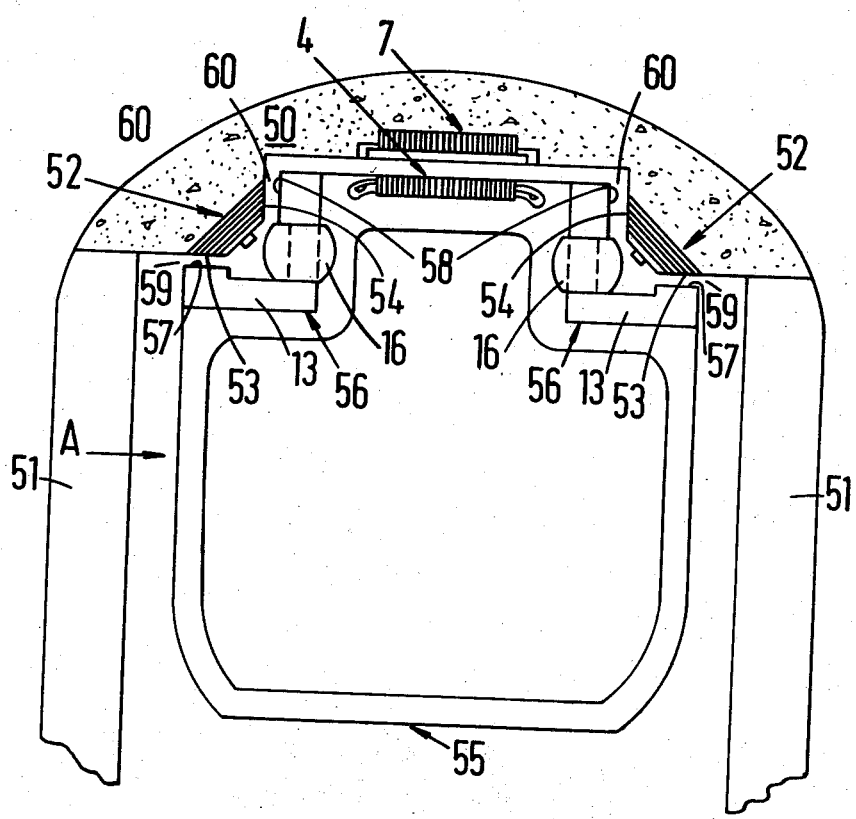
Figure 11:
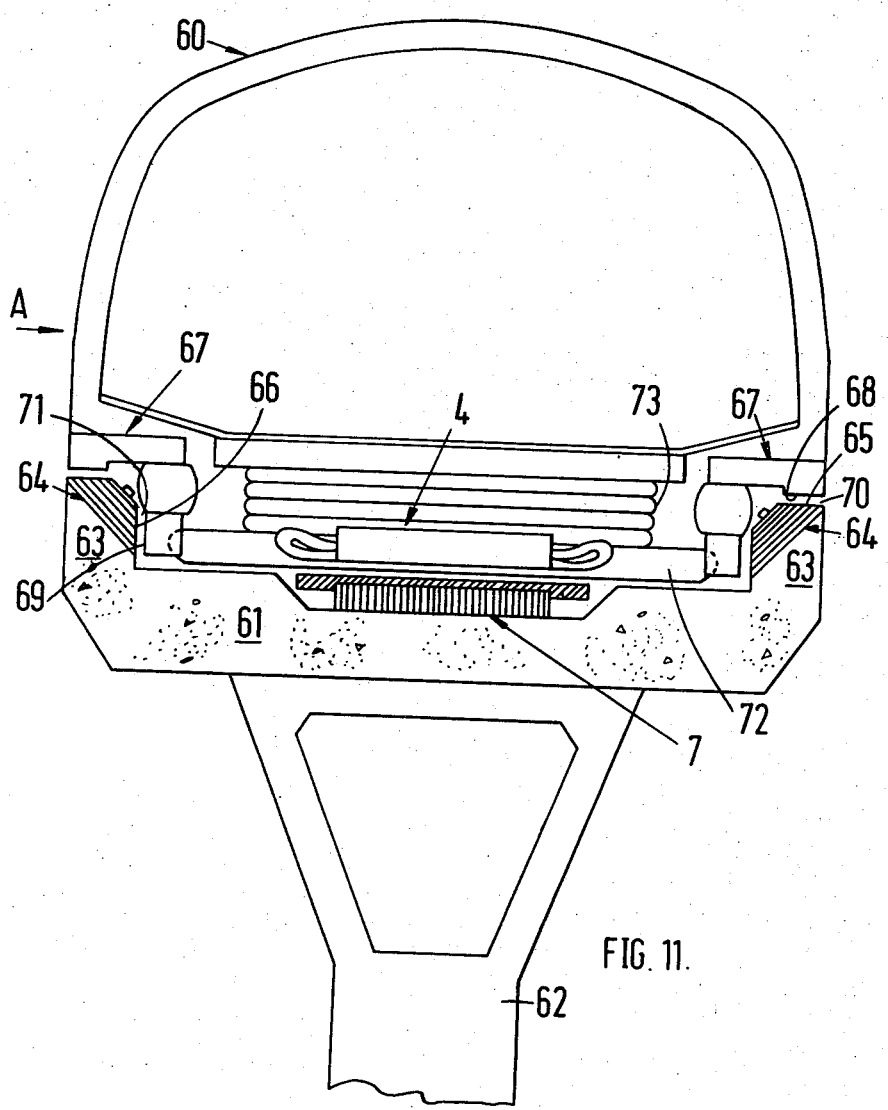

These and other aspects and features of the invention will become apparent from the following description, given by way of example and with reference to the accompanying diagrammatic drawings, of three ground transportation systems embodying the invention. In the drawings:

FIG. 1 shows the first ground transportation system with the vehicle in end elevation and the track generally in transverse cross-section, FIG. 2 is a detail of a system of FIG. 1, showing the arrangement of the electromagnets by which the vehicle is supported and guided, FIG. 3 is a circuit diagram of the electric supply and control circuits for the electromagnets, FIGS. 4 to 9 are views corresponding to FIG. 2 and showing the ground transportation system of FIGS. 1 to 3 in various modifications thereof, FIG. 10 shows the second ground transportation system with the vehicle in end elevation and the track in transverse cross-section, and FIG. 11 similarly shows the third ground transportation system.

Referring now to FIG. 1, a vehicle 1 is adapted for essentially non-contacting operation along a generally concrete track 2 which is substantially rectangular in cross-section and is supported at intervals by Y-shaped support columns 3. The body of the vehicle 1 straddles the track, having its main passenger-carrying portion 20 above the track and having sponsons 21 which extend downwardly from the passenger-carrying portion at each side of the track.

For propelling the vehicle along the track the system includes a single-sided linear induction motor which is conventional both in arrangement and operation, comprising a primary member or "stator" 4 carried at the underside of the passenger-carrying portion 20, and a co-operating secondary member or "rotor" 7 inset into, and extending along, the track top surface. The stator 4 is basically formed of a magnetic core 5 formed with an a.c. energising winding 6; the rotor 7 is basically formed of an electrically conductive plate 8 backed by magnetic backing material 9. Propulsive force is produced when the winding 6 is energised from a three-phase a.c. supply.

Support and guidance for the vehicle is provided by four similar electromagnets 10 mounted along the bottom edges of the sponsons 21. The electromagnets are arranged in two longitudinally disposed pairs of laterally aligned electromagnets, the two electromagnets of one pair being shown in FIG. 1 from which it will be understood that each electromagnet is arranged for co-operation with a magnetic armature 12 which extends along the track so as to form the appropriate bottom corner of the track. On each side of the vehicle the two electromagnets co-operate with the same armature 12 and are of a length to occupy, in combination, a substantial proportion of the vehicle length.

FIG. 2 illustrates in detail the arrangement of each electromagnet 10 and its associated armature 12. Each electromagnet comprises a magnetic core 13 which in cross-section is generally in the form of an upright L, having two mutually perpendicular arms one of which is vertical and the other of which is horizontal; the arms are respectively denoted by the reference numerals 14 and 15. The insides of the arms are rebated in the neighborhood of the crotch between them, and the rebate of the vertical arm 14 provides accommodation for the inner side of a multi-turn energising winding 16 which is disposed to encompass the arm 14. Angle members 17 of a non-magnetic and electrically insulating material such as fibre-glass are secured to the core 13 so as by abutting the top and bottom faces of the winding 16 to secure it in position on the core.

Each armature 12 is, as viewed in cross-section, formed of five plates 18 of magnetic material superimposed upon one another and secured to the concrete of track 2 by a non-magnetic and electrically insulating clamping plate 11 engaged by longitudinally spaced bolts 19 of which one is visible. The plates 18 are bolted against a face 20 formed along the underside of the respective edge of the concrete of track 2 at an angle of 45° to the horizontal; they are parallel-faced and of successively decreasing width, with the result that the armature 12 as a whole is generally isosceles-triangular in cross-section and forms the respective one of the bottom corners of the track. The edges of the plates 18 at the sides and bottoms of the track are chamfered so that the vertical side faces 25 and horizontal bottom faces 23 of the armature 12 forms planar continuations of the side and bottom faces of the track concrete.

For each electromagnet 10 the unrebated part 22 of the top face of the arm 15 directly opposes, and is of a greater width than, the bottom face 23 of the respective armature 12; likewise the part 24 of the inside face of the arm 14 which lies above the coil 16 directly opposes, and is of a greater width than, the side face 25 of the armature 12; the opposed pairs of faces 22, 23 and 24, 25 are spaced from one another in parallel relation by air gaps respectively denoted by the reference numerals 26, 27.

Each electromagnet 10 has its winding 16 individually supplied in a controllable manner by a respective one of four identical supply and control circuits each arranged as shown in FIG. 3 with reference to which the following description is primarily given.

Each electromagnet 10 has a distance transducer 30 mounted on each end surface of its arm 15 (see also FIG. 2) and arranged to produce an output signal representative of the magnitude of the air gap 26 at its locality. The transducers 30 are preferably of a non-contacting (e.g., micro-wave) variety as shown, but alternatively they may be of a contacting variety.

For each electromagnet the two transducers 30 pass their output signals ($h_1, h_2$) to a circuit 31 which, in response produces on a line 32 an output signal in proportion to their average. A comparator 33 compares this average-proportional signal with a reference signal generated by an adjustable reference signal generator 34, and accordingly produces an error-proportional signal on a line 40. The error signal is amplified in an amplifier 35 and thereafter forms the controlling input signal for the firing circuit 36 of the thyristors 37 of a conventional three-phase thyristor bridge generally indicated at 38. The bridge 38 is arranged to operate in the rectifying mode, having a three-phase a.c. supply 39 connected as input across its a.c. terminals, and having the winding 16 of the respective electromagnet 10 connected as load across its d.c. terminals.

Referring again to FIG. 2, it will be seen that each electromagnet and its associated armature 12 forms a low reluctance magnetic path which is orientated transversely of the track axis and around which flux created by the energisation of the winding 16 may be driven as illustrated by the broken line 29.

In passing around this magnetic path the flux crosses the air gasp 26 and 27 in series, and at each air gap generates an attractive force between the coacting pole faces of the electromagnet 10 and armature 12.

The forces across the air gap 26 of each electromagnet 10 are substantially vertical and serve to support the vehicle from the track by maintaining the magnitude of the four air gaps 26 substantially at the values determined by the settings of the reference signal generators. They are controlled directly by the four supply and control circuits in a conventional closed loop manner, for each electromagnet 10 any variation of the magnitude of the respective air gap 26 from the value determined by the associated reference signal generator 34 appearing on the line 40 as an error signal of appropriate magnitude and sense. In response to this error signal the firing circuit 36 advances or, as appropriate, retards the firing of the thyristors 37 so that the voltage across the electromagnet winding 16 is changed to increase or reduce the vertical force across the air gap 26 in a sense to reduce the error. In this respect it will be noted that the thyristors 37 are controlled to operate at a nominal delay angle which is not zero.

Because the electromagnets are independently controlled they can operate differentially as well as in unison. Thus not only is the vertical position of the vehicle relative to the track controlled (i.e., heave control), but also control is effected in the pitching and rolling modes. In the vertical sense, therefore, the vehicle will always closely follow the track despite forces which may be imposed upon it either from the track itself or from, for example, aerodynamic lift.

The ability to adjust the reference signal generators 34 independently of one another means that not only can allowance be made for variations in the vehicle all-up weight from journey to journey, but also the vehicle trim can be automatically or manually corrected whenever necessary.

In the former respect it will be appreciated that the vehicle when heavily loaded will in general require a smaller delay angle for the firing of the thyristors 37 than when the vehicle is lightly loaded. This is in order to provide the necessary increase in the datum values of the forces at the air gaps 26, that is to say, those values obtaining when the error signals on the lines 40 (FIG. 3) are zero. It can be arranged that the datum values of the air gaps 26 during operation are approximately the same whatever the load on the vehicle, the particular value used being the minimum which will ensure little or no contact between the electromagnets and the track. With the air gaps 26 at their datum values the co-operating faces 24, 25 are centrally disposed with respect to one another (in the vertical direction).

Because of the function of the electromagnets 10 to support the vehicle, the attractive forces generated between the faces 24 of the electromagnets and the side faces 25 of the armatures 12 will always be present during normal operation. They will be substantially horizontal in direction.

When the electromagnets 10 are in their datum positions in the vertical sense as previously described, and provided that the vehicle is centrally disposed relative to the track so that the air gaps 27 are equal (and the co-operating faces 22, 23 are centrally disposed with respect to one another), the forces at the air gaps 27 along the two sides of the vehicles will be equal and opposite and no resultant lateral force will be exerted on the vehicle by the electromagnets.

Should, however, this balance be destroyed by a superimposed lateral force (e.g., a cross wind) tending to cause the vehicle either to sideslip or to yaw relative to the track, then, as a result of the ensuing lateral movement of the vehicle, in one or both of the pairs of laterally aligned electromagnets one of the magnets will approach the track and the other will recede from the track.

Initially this movement will be horizontal. However, the increase of the air gap 27 of the or each receding electromagnet will increase the reluctance of the magnetic path associated with that electromagnet, so that the ampere-turns provided by the energisation of its winding 16 will no longer be sufficient to support the vertical load imposed upon it. The associated air gap 26 will accordingly increase as the respective corner of the vehicle drops away from the track, and the associated supply and control circuit will accordingly operate as previously described to increase the voltage across the winding 16. The forces across the air gaps 26, 27 of the electromagnet will each increase by virtue of the increased m.m.f. available, and the electromagnet will pull the vehicle up and into its datum, central position.

It will be appreciated that a similar but opposite effect will occur with the or each electromagnet caused laterally to approach the track. The reduced reluctance will, by increasing the vertical force produced by the electromagnet and thereby reducing the air gap 26, cause the associated supply and control circuit to operate to reduce the voltage across the winding 16 so that the respective corner of the vehicle drops back to its datum position. The lateral force across the air gap 27 is also reduced, so that the control of the opposing (i.e., receding) electromagnet can be more effective to cancel the lateral position error. In that respect the control of the approaching electromagnet can be considered to provide lateral (i.e., sideslip or yaw) stiffness for the vehicle which is in addition to that provided by the control of the receding electromagnet.

In the same way the control of those electromagnets which are approaching the track in the vertical sense will provide stiffness which, during a pitching or rolling motion of the vehicle, is in addition to that provided by the control of the downwardly moving electromagnets.

As previously described, the faces 22, 24 of the electromagnets 10 are wider than the armature faces 23, 25 with which they co-operate. The range of vehicle movement in the horizontal and vertical senses allowed by the supply and control circuits is small enough to prevent the edges of the faces 22, 24 of the electromagnets from moving, during normal conditions of operation, laterally or, as appropriate, vertically beyond the edges of the co-operating faces 23, 25.

Any displacement of the faces of each opposed pair 22, 23 and 24, 25 laterally of one another from their central relative positions will in known manner generate shear forces tending to centralise them with respect to one another. Although in some circumstances they are best avoided, these shear forces are advantageous in that they are of a sense always to aid the controlling action of the supply and control circuits to maintain the desired transverse position of the vehicle relative to the track. However, with the limitation of the preceding paragraph the magnitude of the shear forces will be small. If it is desired to so arrange and/or dimension the faces 22 to 25 that the shear forces available are of the same order of magnitude as the direct forces produced by the electromagnets as previously described, a modified arrangement of the first embodiment may be employed in which the faces 22, 24 of each electromagnet are of the same width as the co-operating faces of the associated armature 12 as shown in FIG. 4.

In a further modification of the first embodiment only one of the faces 22, 24 of each electromagnet is of the same width as its co-operating armature face. Substantial shear forces are then generated in only one sense, vertical or horizontal (as appropriate).

Figure 4:
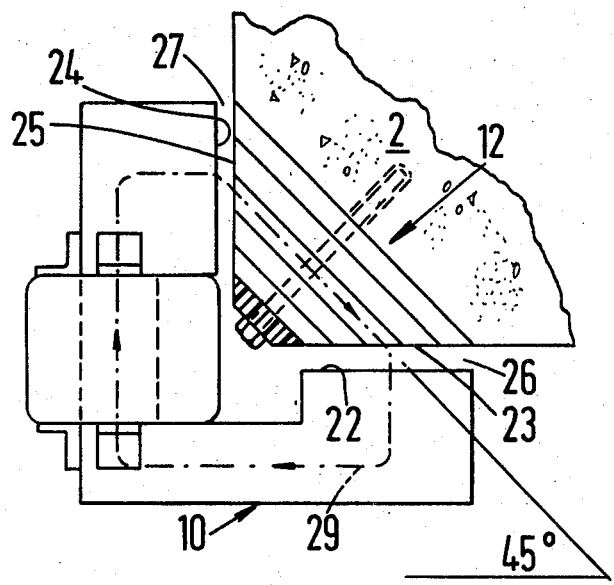
Figure 5:
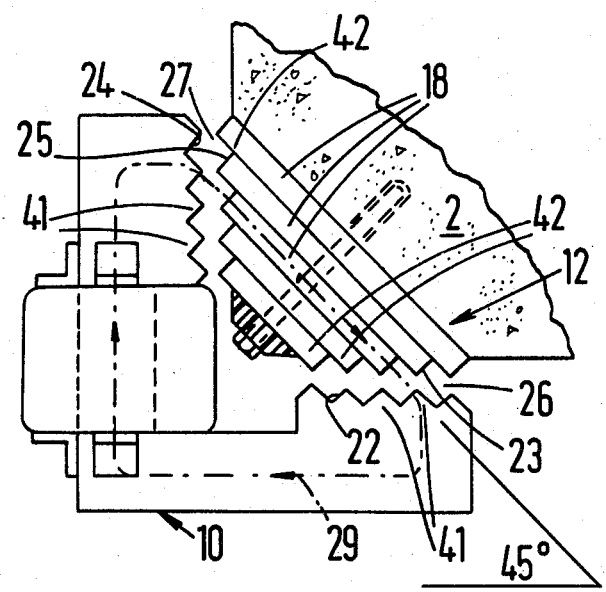

FIG. 5 illustrates how the magnitude of the shear force generated at an air gap can be further increased over and above the increase provided by the arrangement of FIG. 4. Instead of being machined so that the faces 23, 25 which they form are planar, the side edges of the plates 18 of each armature 12 are orthogonal to the faces of the plates so that the faces 23, 25 are of saw tooth form. The faces 22, 24 of the electromagnet 10 are likewise formed with longitudinally extending teeth 41 of the same pitch as the teeth 42 on the armatures. In the central, datum position of the vehicle (as shown) the teeth on the armatures and on the electromagnets are directly opposed to one another. Lateral relative displacement of the faces 22 to 25 of each opposed pair causes each pair of opposed (but offset) teeth to act as a shear force generator; in contrast only a single shear force generator is provided by each pair of opposed faces 22 to 25 in the arrangements of FIGS. 1 to 4.

In addition to providing increased shear force, the arrangement of FIG. 5 also has the advantage of reduced track cost because of reduced machining of the plates 18.

If desired the faces 22 to 25 of the arrangement of FIG. 2 may be formed with opposed teeth as illustrated in FIG. 5.

Figure 6:
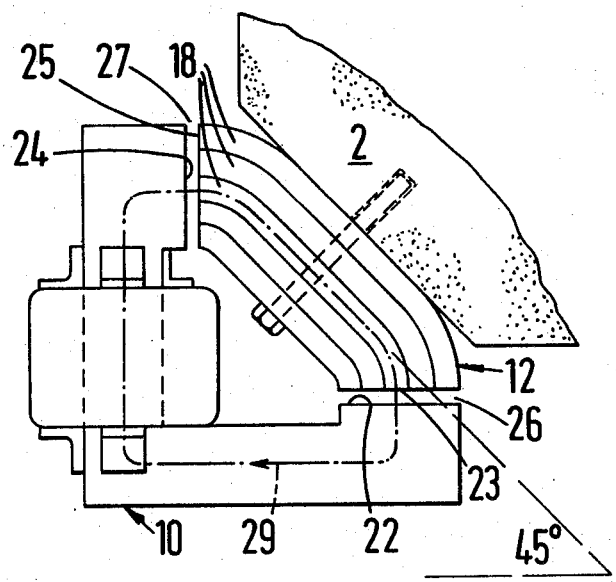

FIG. 6 shows a further modification of the arrangement of FIGS. 1 to 3. As in the previous arrangements each armature 12 is generally inclined at 45° to the horizontal, but whereas the plates 18 of FIGS. 1 to 5 are planar, in FIG. 6 the plates are bent along their edges so as to be vertical at their bottom ends and horizontal at their top ends. The bottom ends of the plates 18 terminate in a horizontal bottom plane face and likewise the top ends terminate in a vertical side plane face. As before, the bottom and side faces are respectively given the reference numerals 23, 25 and their associated air gaps are denoted as 26, 27.

For a given value of flux the direct force generated across each air gap 26 or 27 is inversely proportional to the effective cross-sectional area of the air gap, and it will therefore be appreciated that for the same flux and assuming the same thickness and number of the plates 18, an arrangement of the kind shown in FIG. 6 will provide larger direct forces (and variations of force) than the equivalent arrangement in accordance with FIGS. 1 to 3. It will have the disadvantage, however, that the increased reluctance of the magnetic paths will require more powerful and therefore heavier electromagnets.

Increased shear can be readily provided for an arrangement as shown in FIG. 6 by castellating the faces 22 to 25 to provide opposed teeth of equal pitch on the armatures and the electromagnets. On the armatures this can readily be achieved in the manner illustrated in FIG. 7, by stopping the edges of every alternate plate 18 short of the edges of the other, intervening plates. The faces 22, 24 of the electromagnets are castellated to correspond.

Figure 7:
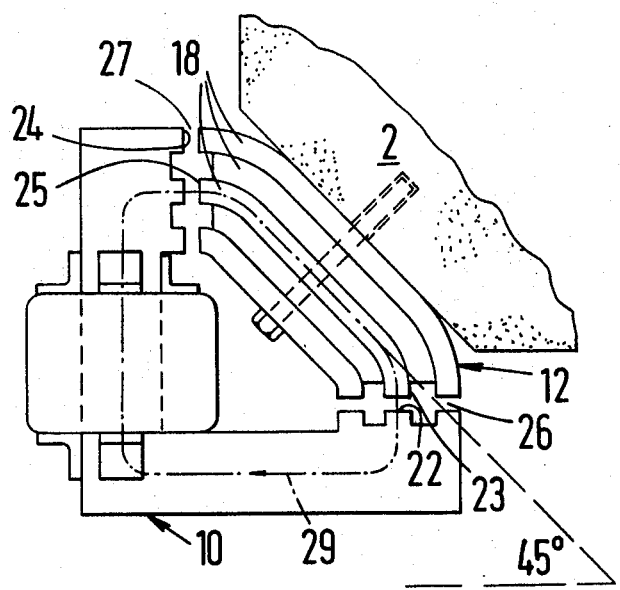

Although the arrangements shown in FIGS. 6 and 7 have electromagnets which, in relation to the associated armatures 12, are of the kind shown in FIGS. 4 and 5, it will be appreciated that they could alternatively comprise electromagnets of the kind shown in FIGS. 1 to 3, that is to say, having faces 22, 24 wider than the opposed faces 23, 25 of the armatures.

Whereas in the arrangements thus far described the armatures 12 have been inclined at 45° to the horizontal so that the faces 23 and 25 have been of equal widths, for some applications of the invention each arrangement may with advantage be modified by inclining the armatures 12 to the horizontal by an angle which is greater or less than 45°. As previously described, the direct force generated at an air gap 26 or 27 is inversely proportional to the effective area of the air gap so that an angle of greater than 45° to the horizontal will result in the direct vertical (i.e., support) forces being greater than the direct lateral (i.e., guidance) forces, and vice versa. Most usually the angle will be greater than 45°; FIG. 8 shows the arrangement of FIG. 2 when modified in this way. In this particular embodiment each armature 12 makes an angle of 60° to the horizontal so that the vertical forces (and variations of force) at the air gaps 26 will be approximately 1.7 times as great as the horizontal forces (and change of force) at the air gaps 27.

The armatures 12 and cores 13 of the arrangements so far described are laminated in order to reduce drag caused by eddy currents which will be induced in them as the vehicle travels along the track. Lamination achieved this reduction of drag by confining the eddy currents to within the thickness of the individual plates or laminations and so increasing the effective electrical resistance of the armature or core.

In the arrangements of FIGS. 1 to 8 the laminations of the cores 13 lie in planes parallel to the planes of the paper, and for that reason the laminated nature of the cores is not apparent from the drawings. Each arrangement, however, may have its cores 13 laminated in planes generally perpendicular to the plane of the paper and parallel to the flux paths 29, and FIG. 9 shows the arrangement of FIG. 7 when modified in this way. It will be noted that the core laminations 43 are suitably dimensioned and disposed to provide the teeth 44 for generating shear force. It will also be noted that the core laminations are individually thinner than the plates 18 of the armatures 12; although such thin laminations are desirable for the armatures 12 from the point of view of drag, they are unlikely to be acceptable from the economic standpoint.

In a modification of each of the arrangements shown in the drawings the laminations of the armatures 12 are parallel to the plane of the paper; in a further possible modification the armatures 12 are unlaminated.

FIG. 10 is a view similar to FIG. 1 showing a further ground transportation system utilising electromagnets operating in the attractive mode for support and guidance.

Referring now to FIG. 10, the track for this embodiment of the invention is in the form of a continuous and generally concrete beam 50 supported along its sides by suitably spaced support columns 51. Along its length the track carries two isosceles-triangular magnetic armatures 52 each identical to the armatures 12 of FIG. 2, having horizontal bottom faces 53 and vertical side faces 54 facing inwardly towards one another.

A vehicle 55 is suspended and guided electromagnetically for operation along the track between the support columns 51. Support and guidance is by four electromagnets 56 mounted at the top of the vehicle in two longitudinally spaced pairs. The electromagnets 56 are identical in arrangement to the electromagnets 10 of FIG. 2 and likewise are disposed in relation to their associated armatures 52 as described with reference to that Figure. Thus each electromagnet is generally L-shaped in cross-section and has faces 57 and 58 respectively opposing the faces 53 and 54 of the armatures. The faces of the opposed pairs 53, 57 and 54, 58 are separated by air gaps 59 and 60 as shown.

For operation the electromagnets are individually controlled by associated supply and control circuits identical to those of FIG. 3, so as to maintain the four air gaps 59 substantially at the values determined by the adjustable reference signal generators of those control circuits. Guidance (i.e., side slip and yaw control) is effected in the same manner as described for the first embodiments.

As in the first embodiment propulsion is by a single-sided linear induction motor having its primary member 4 on the vehicle and having its secondary member 7 on the track.

In FIG. 11 there is shown a further embodiment of the invention in which a vehicle 60 is adapted for operation along and above a generally concrete track 61 supported at intervals by support columns 62. Along its length the top of the track is formed with a central recess between upstanding side portions 63. The inner top corners of the portions 63 are provided by isosceles-triangular magnetic structures 64 identical to the armatures 12, 52 previously described; the armatures 64 have horizontal top faces 65 and vertical, inwardly facing side faces 66.

Electromagnets 67 identical to the electromagnets 10 and 56 are mounted on the underside of the vehicle body in the same disposition in relation to the armatures 64 as has previously been described with reference to FIG. 2 for the electromagnets 10 and the armatures 12. The armature faces which oppose the electromagnet faces 65, 66 are respectively denoted by the reference numerals 68, 69 and the associated air gaps by the reference numerals 70, 71.

Support for the vehicle is provided by longitudinally spaced air cushion pads 72 which are mounted on the underside of the vehicle body by means of flexible bellows 73 which act as secondary suspensions providing a comfortable ride for passengers in the vehicle. Fans (not shown) supply pressurised air to the pads 72 via the bellows 73, and in known manner the pads from peripheral air curtains which form and thereafter contain cushions of pressurised gas supporting the pads, and thereby the vehicle, above the track.

For operation the electromagnets 67 are each connected to a supply and control circuit similar in arrangement and operation to the circuit of FIG. 3. In the vertical sense the electromagnets 67 provide for the vehicle roll stability and, in conjunction with the air cushion pads, heave and pitch stability by maintaining their air gaps 70 substantially at the values determined by the adjustable reference signal generators of their control circuits; in the horizontal sense the electromagnets guide the vehicle, that is to say, they control it in side slip and yaw. In both the vertical and the horizontal senses the vehicle position control is essentially as previously described in relation to the first embodiment except, of course, that in the vertical sense the direction of vehicle motion appropriate to a particular control action of each electromagnet is reversed.

The feature that the vertical forces generated by the electromagnets 67 in providing roll, heave and pitch control for the vehicle act in opposition to the air cushion lift pads is described in co-pending U.S. application Ser. No. 269,831 to which the reader's attention is directed; the addition loading produced in this way by the electromagnets on the air cushion pads has the effect of increasing the stiffness of the pads, and it is hoped that the increased primary stiffness thereby produced will be sufficient to enable the primary member 4 of a single-sided linear induction motor provided for vehicle propulsion to be rigidly mounted on one of the pads as shown; the secondary member 7 of the linear induction motor extends along the track.

Although not apparent from the drawings the electromagnets 10, 56 and 67 of the described embodiments are mounted on the vehicle body by resilient connections which, both in the vertical and horizontal senses, act as secondary suspensions providing a comfortable ride for passengers in the vehicle. In a modification of the third embodiment these resilient connections are omitted and the electromagnets 67 are rigidly mounted on the pads 72. The primary stiffnesses of the electromagnets (by virtue of their control) then act directly in parallel with the stiffnesses of the associated cushions, so further increasing the ability of the pads to support a linear induction motor primary member.

In the embodiments of FIGS. 10 and 11 any of the arrangements of FIGS. 4 to 9 may be used instead of the arrangements of electromagnet 10 and armature 12 shown in FIG. 2.

Arrangements falling within the scope of the invention are possible other than those particularly described. In particular, the control of the electromagnets may be achieved in many different ways; for example, control may be in response to the horizontal position of the vehicle relative to the track as well as, or (if appropriate) instead of, the vertical position thereof.

Although in each of the described embodiments the electromagnets provided are able by themselves satisfactorily to guide the vehicle along the track and, as appropriate, support it from the track or provide its roll stability, in some applications of the invention it may be desirable or necessary to provide additional electromagnets or equivalent devices for providing one of these functions.

A particular feature of each of the basic configurations shown in FIGS. 1, 10 and 11 can be appreciated from the vehicle response to a cross wind acting in the direction indicated by the arrow A, the centre of pressure of the cross wind being at the point of the arrow.

Considering the electromagnets on one side of the vehicle by taking moments about a longitudinal axis of the electromagnets on the other side, it will be appreciated that the cross wind will tend to cause the air gaps on the left hand side of the vehicle to expand and those on the right hand side of the vehicle to contract.

For each electromagnet the two air gaps therefore expand or contract together, so that the resulting action of the associated supply and control circuits to increase or, as appropriate, reduce the energising ampere-turns of the electromagnet is of the correct sense in both the vertical and horizontal senses. Thus, despite the fact that only one control parameter (electromagnet voltage) is used, the vehicle is both supported and guided electromagnetically along the track in a manner to satisfactorily resist any normal disturbance imposed upon it either from the track or otherwise.

Although in each of the described arrangements the co-operating faces of the magnetic cores and their associated armatures are described as being parallel to one another and either vertical or horizontal (as appropriate), such exact relationships and attitudes are not necessary; the faces may individually be only substantially vertical or substantially horizontal, as the case may be, and need not be in exactly parallel relation.

We claim:

1. For use with a ground transportation system comprising a prepared track:
   a vehicle comprising a vehicle body;
   first and second electromagnets spaced laterally apart on said body and each having a magnetic core and an energising winding, the core of each electromagnet having first and second pole faces substantially conforming to respective planes, the normals to which lie in a perpendicular plane oriented transversely of the vehicle body, the normal to the first pole face having a vertical component and the normal to the second pole face having a horizontal component and being inclined to the normal to the first pole face, the second pole face of the first electromagnet facing in the opposite direction to that of the second electromagnet;

a position sensor for each electromagnet adapted to sense the vertical position of such electromagnet;

and control means for each electromagnet responsive to said position sensor for varying the supply of current to said electromagnet.

2. A vehicle as claimed in claim 1, in which the first pole face of each electromagnet is substantially horizontal and the second pole face of each electromagnet is substantially vertical.

3. A vehicle as claimed in claim 1, in which the core of each electromagnet is laminated longitudinally of the vehicle.

4. A vehicle as claimed in claim 1, in which the core is laminated transversely of the vehicle.

5. A vehicle as claimed in claim 1, in which the control means includes at least one thyristor for controlling the supply of current to the electromagnet, a comparator for comparing the output of the sensor with a reference signal and a firing circuit responsive to the comparator for controlling the firing time of the thyristor.

6. A vehicle as claimed in claim 5, in which each electromagnet is provided with two sensors spaced longitudinally therealong and the control means includes means for determining the average output signal from the two sensors.

7. A vehicle as claimed in claim 1, in which the first pole face of each electromagnet is upwardly directed.

8. A vehicle as claimed in claim 1, in which the first pole face of each electromagnet is downwardly directed and air cushion pads for supporting the vehicle are mounted on the underside of the vehicle body.

9. A ground transportation system comprising a prepared track and a vehicle adapted for operation along the track;

the vehicle comprising a vehicle body;

first and second electromagnets spaced laterally apart on said body and each having a magnetic core and an energising winding, the core of each electromagnet having first and second pole faces substantially conforming to respective planes, the normals to which lie in a perpendicular plane oriented transversely of the vehicle, the normal to the first pole face having a vertical component and the normal to the second pole face having a horizontal component and being inclined to the normal to the first pole face, the second pole face of the first electromagnet facing in the opposite direction to that of the second pole face of the second electromagnet;

the track comprising magnetic material extending along the track and arranged confronting the pole faces of each electromagnet so as to provide, in combination with the core of each electromagnet, a low reluctance path for a magnetic flux generated by energisation of the respective winding;

the vehicle also comprising a position sensor for each electromagnet adapted to sense the vertical position of such electromagnet relative to the track and control means for each electromagnet responsive to said position of sensor for varying the supply of current to the energising winding of said electromagnet so that, by varying the attractive forces between the cores of the electromagnets and the magnetic material of the track, the electromagnets maintain the vehicles substantially at a predetermined transverse position relative to the track.

10. A ground transportation system as claimed in claim 9, in which the first pole face of the core of each electromagnet is substantially horizontal and the second pole face of the core of each electromagnet is substantially vertical.

11. A ground transportation system as claimed in claim 10, in which the track comprises a structural member of non-magnetic material extending along the length thereof, the magnetic material being in two parts located at horizontally adjacent corners of the structural member.

12. A ground transportation system as claimed in claim 11, in which each part of the magnetic material of the track comprises a stack of plates extending longitudinally of the track and inclined at an angle between the normals to its two pole faces.

13. A ground transportation system as claimed in claim 12, in which the ends of the plates are bent so as to be normal to their two pole faces.

14. A ground transportation system as claimed in claim 11, in which the structural member comprises a beam of rectangular cross-section having the two parts of the magnetic material of the track disposed at its lower two corners, the beam being supported from its underside, and the vehicle is located above the track and has downardly extending sponsons on each side of the beam and carrying the electromagnets on their lower ends.

15. A ground transportation system as claimed in claim 11, in which the track comprises a beam having a longitudinally extending recess of rectangular cross-section in its lower surface, the two parts of the magnetic material of the secondary being disposed on the lower corners of the rectangular recess, and the vehicle is disposed below the beam and has the electromagnets located on a projection which extends upwardly into the recess.

16. A ground transportation system as claimed in claim 11, in which the structural member of the track comprises a beam having a longitudinally extending rectangular recess in its upper surface, the two parts of the magnetic material of the track being disposed on the upper corners of the parts of the beam defining the rectangular recess and the vehicle is located above the track and has air cushion pads extending into the rectangular recess.

17. A ground transportation system as claimed in claim 9 in which the magnetic material of the tracks includes four respective pole faces each confronting a corresponding pole face on the vehicle, at least one pole face of each electromagnet being the same width in a transverse direction as the corresponding pole face of the track.

18. A ground transportation system as claimed in claim 9, in which the magnetic material of the track has four pole faces each confronting a respective pole face of the magnetic cores of the electromagnets, at least one pair of confronting pole faces having convolutions relative to the respective planes to which such pole faces substantially conform, such convolutions extending longitudinally of the track so located that positions of maximum projection on the pole faces forming such pair confront one another when the vehicle is in its desired position relative to the track.

* * * * *